Nov. 30, 1954     O. BRÜCKE     2,695,868
METHOD AND APPARATUS FOR TREATING
LIQUIDS WITH GASES OR VAPORS
Filed Aug. 15, 1951     2 Sheets-Sheet 1
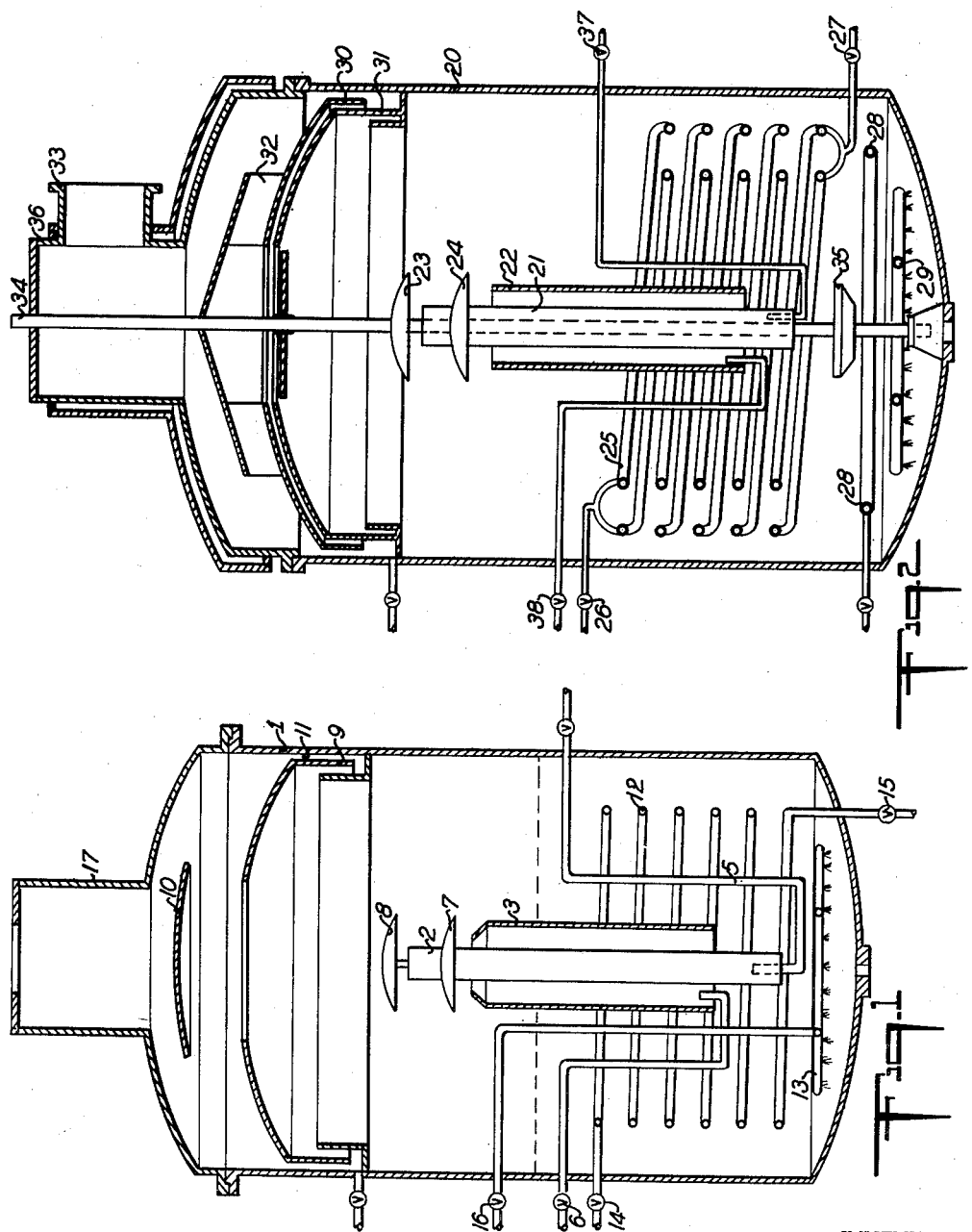
INVENTOR
OTTO BRÜCKE
BY Burgess and Dinklage
ATTORNEYS

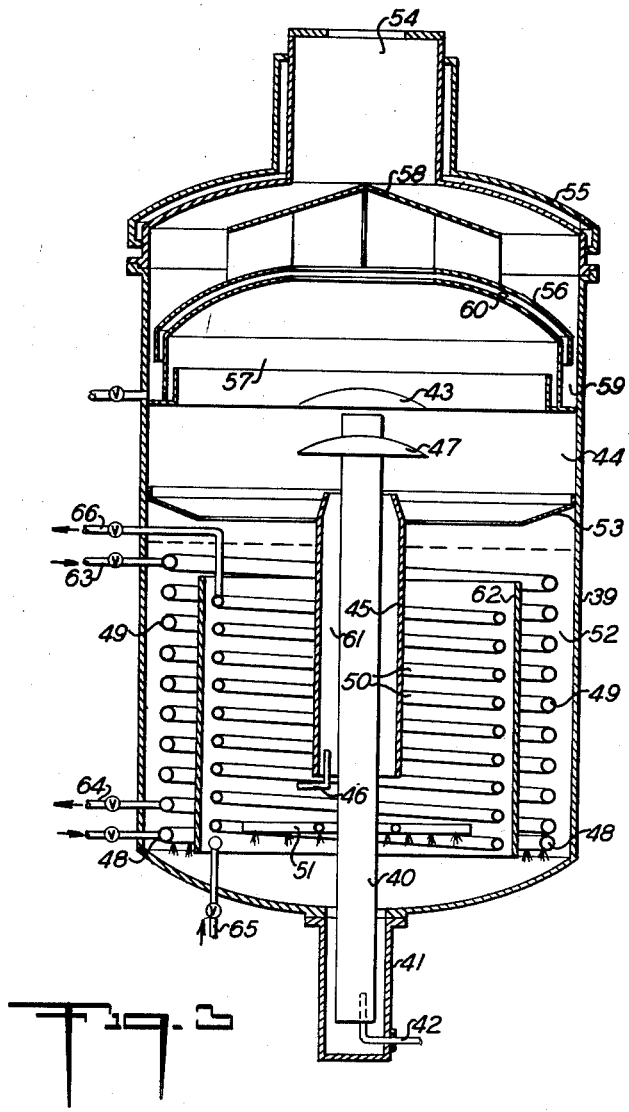

United States Patent Office

2,695,868
Patented Nov. 30, 1954

2,695,868

METHOD AND APPARATUS FOR TREATING LIQUIDS WITH GASES OR VAPORS

Otto Brücke, Hochspeyer (Pfalz), Germany, assignor to Metallgesellschaft Aktiengesellschaft, Frankfurt, Germany, a corporation of Germany Application August 15, 1951, Serial No. 241,931

Claims priority, application Germany August 18, 1950

20 Claims. (Cl. 202—46)

This invention relates to a method of treating liquids with gases or vapors.

In the treatment of liquids with gases or vapors, as for example in the deodorization of oils, fats, waxes, resins, of animal, vegetable, or synthetic origin, in the steam disillation of fatty acids, concentrated miscellae (those miscellae from which a part of the solvent has previously been distilled off), mineral oils, or the like, or in the oxidation of paraffins with air, a good mixing of liquids and vapors or gases had previously been achieved by circulating the liquids with a gas or vapor on the principle of pressure gas liquid lift or of the air lift pump. An apparatus working in accordance with this principle is known to consist of a vertical pipe (rising pipe) which is disposed in the liquid to be treated which projects above the level of the liquid. The pipe is either open at the bottom or furnished with apertures for the admission of the liquid and with means of introducing a gaseous or vaporous delivery medium. The delivery medium drives the liquid upwards in the rising pipe, so that the liquid is distributed out of the rising pipe, which is open at the top, into the vapor chamber of the vessel. In the vapor chamber the liquid falls back to the level of the liquid and is re-circulated. During the circulation, vapors or gases can be introduced simultaneously into the liquid, as for example by sprinkling, and in addition cooling or heating devices may be provided in the treatment vessel.

A method is also known for distilling mineral oils by the use of a vacuum and steam, in which the oil to be distilled is continuously raised with the aid of several circulating devices which are connected in parallel and work on the principle of the pressure gas liquid lift. The circulating devices are disposed side by side in a still, and the oil is passed over sprinkling units provided in the vapor chamber of the still. There is thus a direct transmission of the heat needed for the distillation to the oil through molten substances, the oil and the molten mass being lifted together by the delivery vapor through the rising pipes of the circulating device into the vapor chamber of the still. For this purpose, the still in which the circulating devices are installed is filled with molten substances, as for example molten metal, while the oil to be distilled and the steam required to deliver the oil and the molten mass are introduced through separate pipes. The molten metal is utilized to supply the heat for the distillation. This procedure may be found in German Patent No. 592,311. The molten mass which is simultaneously circulated, after dropping on to the surface of the remaining molten substances, is passed through a re-heating chamber outside the still and then recycled back into the latter. However, the molten mass present in the still may also be heated with the aid of hot gases or the like passed through re-heating passages without the necessity of removing the mass from the still.

In the mixing of liquids and gases or vapors by these known methods, particularly when effected in a vacuum, as for example at an absolute pressure of about 3 to 30 mm. mercury, there is a danger that heavy frothing will occur. This may lead to the frothing-over of the liquid, and portions of the liquid may be carried out of the treatment vessel by the gases or vapors.

The object of the present invention is to obviate these disadvantages.

This object is achieved, according to the invention, by distributing the circulated liquid in the vapor chamber of the treatment vessel from different heights as, for example from different superimposed points. This achieves a good destruction of foam and separation of vapor and liquid in the treatment vessel, and in addition the circulation output can be further considerably increased and the time of treatment correspondingly shortened.

The movement of the liquid can be even further intensified by using a further stirring mechanism, as for example a mechanical stirrer, in addition to circulating devices.

A further improvement may be effected by imparting a rotary movement to the curtains or jets of liquid distributed in the vapor space by the circulating devices.

This method of circulating the liquid in the treatment vessel is advantageous in that large amounts of liquid may be passed through the vessel, since on the one hand the distillation takes place substantially in the vapor space of the treatment vessel, and on the other hand foam forming above the liquid is very quickly destroyed by the circulating liquid, so that frothing over of the treatment vessel need not be feared even when using large amounts of gas or vapor.

A further development and improvement of this treatment may be effected by passing the whole or the bulk of the liquid delivered by the central circulating device, on to the mixture of liquid and vaporous and gaseous substances which rises out of an annular chamber formed along the cylindrical walls of the treatment vessel, and in which the liquid is driven upwards by a gaseous or vaporous medium introduced at the bottom. It is thus possible to mix the liquid contents of the treatment vessel so thoroughly that the liquid in the liquid chamber will have practically a uniform composition. In addition, since very large amounts of liquid constantly arrive above the level of the liquid and pass into the vapor chamber of the treatment vessel, the speed of distillation is greatly increased. Finally, the distilling off from the liquid takes place substantially in the vapor chamber from dissolved layers of liquid, so that it proceeds particularly gently, and relatively low distillation temperatures can be maintained.

The liquid delivered by the central circulating device is advantageously guided on to a guide surface which is so disposed on the wall of the distilling vessel that the liquid running off the guide surface impinges on the liquid rising through the annular circulator disposed on the wall of the still. In this manner, the destruction of foam and also the mixing are further enhanced. In addition, the still can be equipped with known devices, such as heating and cooling systems, steam sprays, drop catchers, and bell-shaped fitments in the vapor chamber which are used, for example, for the separation of suitable substances from the vapors passing off.

An apparatus suitable for the use in carrying out the hereindescribed process is, for example, constructed by disposing around the rising pipe of a first circulating device, a second pipe, the upper mouth of which is positioned at a suitable distance beneath the upper mouth of the inner rising pipe. There is thus produced between the inner and outer pipes an annular space, which, in accordance with the invention serves as rising pipe for a second circulating circuit. Both circulating devices may be equipped moreover, in known manner, with introduction and distribution devices for the gaseous or vaporous driving medium. Above the upper mouths of the circulating devices, devices such as baffle plates may be provided, which impart the desired direction of flow to the liquid flowing out of each rising pipe and distribute the same into the vapor chamber of the still, for example, in thin layers or as a curtain. The two coaxial pipes may end at the bottom approximately at the same distance from the base of the still. The outer pipe, however, is preferably not as deeply immersed in the liquid as the inner pipe; for example, it extends downwards only as far as the middle height of the layer of liquid. In this manner, more satisfactory results may be obtained.

In order to enable the invention to be more readily understood, reference is made to the accompanying drawings, which illustrate diagrammatically and by way of example, various embodiments of stills in accordance with the invention, and in which:

Figure 1 is a vertical section through one embodiment of still; and

Figures 2 and 3 show other embodiments, likewise in vertical section.

In the embodiment shown in Figure 1, a rising pipe 2 is disposed in the centre of a still 1, and coaxially therewith there is disposed another rising pipe 3, which at the top and at the bottom is about 500 to 1000 mm. shorter than tube 2. 5 and 6 are supply pipes for the driving medium to the pipes 1 and 2 respectively; above the pipe mouths are located the baffle plates 7 and 8. The latter are advantageously fastened to the pipe 2. 9 is a bell-shaped fitment, which serves to catch condensate forming at the upper part of the still and also any drops of liquid which may still be entrained by the vapors and which are deposited on the insert 10, and to conduct them into the gutter 11, from which they may be separately withdrawn. For the purpose of heating, if desired, cooling the liquid, a combined heating and cooling coil 12 can be provided in the still, with corresponding inlets and outlets 14 and 15 respectively for the heating or cooling medium.

In addition, one or more sprays 13 for the direct introduction of gases or vapors with corresponding inlets 16, are provided. These sprays 13, may be used, for example, to introduce steam, air, etc., into the still. 17 is the offtake of the still, through which the vapors flowing off are passed to a condensation plant of known construction.

The annular space of the circulator can be subdivided in the longitudinal direction, or, instead of the pipe 3, a plurality of separate rising pipes may be disposed on the periphery of the pipe 2. The driving media will then be supplied separately to each of these pipes, so that these pipes jointly effect a second circulation circuit.

In the embodiment shown in Figure 2, a vessel 20 is likewise equipped with an inner rising pipe 21, an outer rising pipe 22, and with baffle plates 23 and 24. In addition, a combined heating and cooling device 25 with inlets and outlets 26 and 27 respectively for the heating or cooling medium is provided, as well as sprays 28 and 29 with vapor or gas inlets. Moreover, bell-shaped fitments 30, with catch channels 31, and fitments 32 for separating drops from the vapors passing out, are disposed in the vapor chamber of the still, from which the vapors escape through the branch 33 and are further treated in a known manner. The central shaft 34 serves to drive the stirrer 35. In addition, the baffle plate 23, for example, may be secured to this shaft, so that the latter can likewise be caused to rotate. The shaft can, for example, be driven by a motor, which is advantageously mounted on the cover 36 of the distilling apparatus. The pipes 37 and 38 serve to supply the driving medium.

The arrangement may also be such that, if desired, while retaining the stirrer 35, the circulating pipes 21 and 22 or the circulating pipe 21 alone are connected to the shaft 34 and continuously or partly rotated during operation. Likewise, in this embodiment the outer circulator may be modified as described with reference to Figure 1.

In the embodiment shown in Figure 3, a circulating device is disposed in the centre of the still 39. It consists of a pipe 40, the bottom open end of which extends to a point near the base of an attachment 41. This tubular attachment is fastened to the bottom of the still and is in communication with the still, so that the liquid to be treated can pass out of the vessel 39 into the attachment 41 and out of the latter into the pipe 40. The pipe 40 is equipped with a device 42 for the supply of a gaseous or vaporous driving medium. Above its upper end, which extends into the vapor chamber of the still, a baffle plate or the like 43 can be disposed. The object of element 43 is to impart a suitable direction of flow and distribution in the vapor chamber 44 to the mixture of liquid and gas or vapor passing out of the upper mouth of the pipe 40. Around the pipe 40 another pipe 45 may be disposed in such a manner that an annular space 61 is produced between the two pipes. Pipe 45 is provided with inlets 46 at the bottom portion thereof for a gaseous or vaporous driving medium. Above the mouth of the pipe 45 leading into the vapor chamber of the still, a baffle plate or the like 47 can be disposed.

An insert 62 lies in the still, preferably coaxially to its walls. The annular space between the walls of the still 39 and the insert 62 is equipped with a heating means, as for example, heating coils 49, and at the bottom with inlets 48 for a gaseous or vaporous driving medium. In addition, tubular coils 50 which may be operated as cooling or heating devices are provided in the space within the insert. The heating or cooling medium is supplied to coils 50 through the pipe 65 and is withdrawn from the coils through the pipe 66.

The spray 51 in the bottom part of the still serves to introduce steam or similar gases or vapors into the liquid to be distilled. The apertures from which the vapor or the gas flows out of the spray 51 are preferably disposed obliquely, so that the medium passing out imparts a rotary motion to the liquid contents of the still.

Guide surfaces 53 may be provided at a suitable height above the annular space formed by the insert 62 and the wall of the still.

A branch 54 in the cover 55 of the still serves for the offtake of the vapors from the still. This cover and, if desired, the branch can be constructed with double walls. The space between the two walls can at the same time be connected to a device for producing a vacuum, thus obtaining good thermal insulation of the cover and a corresponding reduction of the condensation phenomena in the upper part of the still. A cooling agent may also be conducted into the space between the two walls in order to separate substances from the vapors in the still itself by condensation. These substances are received by the bell-shaped device 56 located in the upper part of the vapor chamber 44, and the central aperture 57. Between the roof 58 and the bell-shaped device 56 there is sufficient distance for the vapors to pass unhindered between the roof and the bell. The condensate which is deposited on the bell 56 is collected in the channel 59 and removed in a suitable manner. The bell-shaped device 56 can also be double walled, in order to provide heat insulation of the space beneath the bell in relation to the space lying thereabove, and the space formed by the double walls can be connected to a vacuum-producing device.

In operation, the liquid present in the still is continuously lifted into, and distributed in, the vapor chamber 44 by the central circulating device 40, 41, 42, 43, which is constructed along the style of an air-lift pump, and by the other circulating device 45, 46, 47 working on the same principle. The curtains or layers of liquid passing out of the central circulating devices are so guided that a substantial portion of this liquid impinges on the quantities of liquid which are raised continuously in the annular space 52 by the driving medium flowing out of the perforated supply pipe or an annular passage provided with numerous apertures. This arrangement provides for a thorough mixing of the amounts of liquid moved through the different circulation circuits. This mixing action may be further improved by virtue of the fact that the amounts of liquid delivered by the circulating devices are directed on to the guide surfaces 53 and flow from these guide surfaces on to the mixture of liquid and gaseous or vaporous driving medium passing out of the top of the annular space 52.

Although the intensity of the distilling-off out of the various liquid circuits is different, nevertheless the composition of the liquid in the liquid space of the still is practically uniform throughout. The distillation process accordingly proceeds very rapidly and uniformly.

The guide surfaces 53 are not absolutely necessary. The liquid flowing out of the central circulating device can be directed by the baffle plates 43 and 47 on to the inner wall of the still 39. The liquid flowing down this wall then impinges on the mixture of liquid and vapor or gas raised in the annular space 52. A good mixing of the circulated amounts of liquid is also obtained in this manner, and this mixing is further promoted by the fact that the mixture flows back quickly to the circulating devices. Since the efficiency with which the substances to be evaporated distil off from the amounts of liquid located in the different circuits is not the same, an intensive mixing of the amounts of liquid delivered by the different circulating devices, before they return to the circulating devices, is of particular importance.

Through the action of the spray 51 the mixing is further intensified. In addition, the medium, in gas or vapor form, which is supplied by the spray is very well distributed in the liquid to be distilled, and its distillation-promoting effect is applied to a particularly great extent.

A further substantial advantage of the invention resides in the fact that, despite the use of the maximum amount of distillation and driving medium per unit of volume of the still, and despite the most intensive movement of the liquid in the still, the frothing-over of the liquid is prevented. This is possible, since the distributed liquid passing out of the central circulating device effects an excellent destruction of foam.

This effect is substantially increased by the fact that the liquid flowing off from the guide surfaces 53 impinges on the mixture of liquid and gas or vapor rising in the annular space. In this manner, despite the use of large amounts of vapor or gas, and even with a very high vacuum, no liquid, or only very slight amounts of liquid, are carried out of the still by the vapors.

Through this destruction of foam it is also possible to employ the upper part of the vapor chamber and the bell-shaped device 56, 60 to separate from the vapors, with a good degree of purity, higher boiling substances such as ketones, phytosterols, cholesterols, or similar substances.

The distillation of the substances to be separated takes place in the vapor chamber of the still at the highest vacuum which can be obtained in the apparatus, that is to say under very good distillation conditions. By virtue of the hereindescribed method it is possible to effect this separation in a very short time and with a very good yield from the apparatus. In addition, the distillable substances decrease easily and rapidly. Apart from the shortening of the distillation time, the invention enables the working temperature to be kept very low. The economy of the hereindescribed method is also considerably increased, and in addition the quality of the products and the yield are improved.

The installations working in accordance with the hereindescribed method can be operated by hand or entirely or partly automatically. For example, they can be put into operation and emptied manually, while the actual operation of the distillation, including any subsequent cooling or after-evaporation processes, can be controlled automatically. A very good control of the operation is thereby ensured.

The invention will be illustrated by the following non-limitative examples.

*Example I*

It is desired to deodorize groundnut oil in the vessel 1. The circulation of the oil is effected by water vapor under vacuum. Vessel 1 is maintained during the steaming process under a vacuum of, for example, 5 mm. mercury. The mixing of the groundnut oil with the steam is effected by the combined pipe and annular space circulator, and also by the star spray 13. The steam entering the vessel 1 (which is under a high vacuum) through the spray 13 effects an intense mixing of the oil, and a thick layer of froth is formed on the surface of the latter.

The oil is heated by means of the coil 12.

At first only sufficient steam is admitted into the star spray 13, which is located close to and above the base of the still 1, to prevent the formation of a thick layer of foam above the oil. After an oil temperature of about 100° C. has been reached, the operating steam of the two circulators 2 and 3 is applied. After this steam has been brought into operation, the steam valve for the star spray 13 is fully opened. The double circulation circuit then prevents the vapors flowing off out of the still 1 from entraining large amounts of neutral oil.

Above the oil, which is in intense movement, there is a layer of foam which consists of a mixture of foam bubbles, containing neutral oil, and water vapor. The height of this layer of foam is limited by the oil thrown off by the two baffle plates 7 and 8. This layer of foam is at the same time exposed to the maximum vacuum produced in the still, and therefore the odorous and flavouring substances or the like can be distilled off therefrom under very favorable conditions.

The driving steam of the annular space circulator 3 is mixed with the oil, which for example is aspirated out of the bottom part of the distilling apparatus, i. e. about one-third of the height of the oil from the bottom, and hurls the same against the baffle plate 7. The baffle plate 7 distributes it uniformly and forces the oil through the layer of foam, thereby destroying the foam bubbles and enabling the distillable substances to be easily distilled off, while the oil emanating from the destroyed foam bubbles returns to the contents of the apparatus. At the same time, the oil is drawn off from the bottom of the still by the driving steam of the pipe circulator 2, mixed with the steam, and hurled violently against the baffle plate 8. In this manner, the oil, which is in a state of uniform distribution, is impinged on to the periphery of the still. The vapors from the steam spray 13, and also those of the expanded driving steam from the annular space circulator 3, which are already more or less charged with distillable substances, must flow through this curtain of oil. As such, a suitable distilling-off of odorous substances and the like is effected and in addition particles of neutral oil are separated from the vapors. The circulator 3 acts as a foam destroyer and oil separator, and prevents the contents of the still from frothing-over. The pipe circulator 2 also prevents the entrainment of neutral oil by the vapors, and in addition serves as a safety device for the destruction of foam. The two circulation circuits also effect an extremely intense mixing of the oil in the steamer, and this is further intensified by the spray steam from the star spray 13. These circuits also effect an intensive mixing of oil and driving steam. In this manner and also by means of the high vacuum, very favorable distilling conditions are produced, so that odorous and taste-imparting substances present in the oil, free fatty acids, and the like may be rapidly and non-destructively distilled off, without permitting any appreciable amount of oil to be entrained by the vapors out of the still.

After deodorization, the oil can be cooled in the still, for example to a temperature of about 50 to 80° C., for example by passing cooling water through the coil 12.

When using the apparatus illustrated in Figure 2, the process can be carried out in the same manner. A rather shorter treatment time is then sufficient.

*Example II*

It is desired, for example, to deodorize groundnut oil, which before deodorization has been freed in known manner from impurities such as mucins, phosphatides, free fatty acids, a larger or smaller part of the colouring substances, and the like.

5000 kg. of groundnut oil, which has a temperature of 50° C., are aspirated into the still 39, which is under vacuum. During operation the vacuum amounts, for example, to 5 mm. mercury.

Steam is first allowed to flow into the groundnut oil in the annular space circulator 52 through the perforated tubular annular spray 48, and this steam therefrom uniformly mixes and vigorously circulates the oil. The heating steam for the heating coil 50 is then turned on and the oil is heated. The driving steam is then introduced through the device 42 into the circulator 40. The steam is mixed with the oil. The oil-steam mixture is passed on to the baffle plate 43, which impinges the oil, uniformly distributed above the surface of the liquid in the vapor chamber 44 of the still 39, upon the periphery of the still. Finally, the driving steam is admitted into the annular space circulator 45 through the device 46, said circulator throwing the oil-steam mixture against the baffle plate 47. Curtains of oil are formed in this manner, and these curtains of oil spread out uniformly beneath the liquid surface, starting from the circulator 40, in vapor chamber 44, and are impinged upon the periphery of the vacuum still 39.

The curtains or layers of liquid passing out of the two circulating devices are guided by the baffle plates in such a manner that they rebound, for example, on the guide surfaces 53 and flow off the latter on to the mixture of oil and driving medium passing out of the top of the annular space 52. There is at the same time a very good mixing of the amounts of liquid moved through the different circulation circuits. After the mixing of the oil flowing off the guide surfaces 53 with the mixture of oil and steam flowing out of the annular spray at the top, the oil flows into the space within the insert 62. The spray 51, which is operated with driving steam, is located in this annular space. The apertures from which the steam enters the oil are preferably disposed obliquely, so that the medium passing out imparts a rotary motion to the liquid contents, whereby the mixing is further improved.

The liquid then flows at a rapid speed to the suction points of the three circulators, from which points it is re-cycled to the circuit.

The afore-described type of circulation of the liquid in the still is advantageous in that high throughputs can be achieved. This is so because on the one hand the distillation takes place substantially in the vapor space of the still, and because on the other hand foam which forms above the liquid is rapidly destroyed by the liquid circulated, so that frothing over of the still need not be feared even when using large amounts of steam.

The vapors which entrain the odor-imparting and taste-imparting substances or the like flow out of the vapor chamber 44 through the bell-shaped device 56 and through the dome enclosed by the cover 55 and the aperture 54 into the condensation plant. The cover 55 is provided with a double jacket. The space between the two walls of the double jacket is connected to a device for the production of a vacuum. In this manner, it is possible to obtain a high thermal insulation of the cover and a corresponding reduction of the condensation phenomena in the upper part of the still.

The groundnut oil is heated in the still, for example to a temperature of 150° C., and deodorized at that temperature for two hours. The heating steam for the heating coil 49 is then cut off, and thereupon cooling water is introduced into the combined heating and cooling coil 50. The mixing of the oil through the three circulation circuits is maintained while the oil is cooled down to a temperature of, for example, 110° C.

Beyond the still 39 an oil re-cooler may be provided, which is likewise under high vacuum. In the re-cooler, which at the same time is an after-still, the oil cooled to 110° C. in the still is run off. During the emptying of the still, the driving steam inlets for the three circulators can be cut off. In the re-cooler the groundnut oil is then cooled down to the desired temperature, with the further passage of steam.

With such an apparatus about 35 tons of ground nut oil may be deodorised in 24 hours.

The completely cooled oil can be pumped out of the oil cooler into the storage tanks with a pump delivering out of the vacuum.

However, it is also possible to work without a re-cooler. The groundnut oil is then cooled in the still 39 to the desired temperature.

What I claim is:
1. In a method for the treatment of liquids with gaseous fluids in which the liquid is circulated from a liquid zone to a vapor zone, upwardly through a vertical path of flow by injection of a gaseous fluid, the improvement which comprises circulating the liquid upwardly through at least two separate vertical paths of flow terminating at different heights within said vapor zone by injection of said gaseous fluid, said vertical paths of flow being so positioned that liquid circulated through one said path of flow contacts liquid being circulated through said other path of flow in said vapor zone.

2. Improvement according to claim 1, which includes imparting rotating movement to the liquid circulated to said vapor zone.

3. Improvement according to claim 1, which includes additionally introducing gaseous fluid into the liquid in said liquid zone, while stirring the liquid therein.

4. Improvement according to claim 1, which includes passing a mixture of the liquid and the gaseous fluid upwardly through an annular path of flow surrounding said vertical paths of flow, whereby the liquid from said vertical paths of flow impinges on the mixture of liquid and gaseous fluid from said annular path of flow.

5. Improvement according to claim 1, in which one of said paths of flow is an annular path of flow surrounding the other path of flow.

6. Apparatus for the treatment of liquids with gaseous fluids, which comprises a substantially closed vessel defining a vapor chamber in the upper portion thereof and a liquid chamber in the lower portion thereof, a first riser pipe for liquid in said vessel extending vertically upwardly from said liquid chamber and terminating in said vapor chamber, at least one second riser pipe extending from said liquid chamber vertically into said vapor chamber and terminating in said vapor chamber below said first riser pipe, a baffle positioned above said first riser pipe in said vapor chamber so that liquid passing through said first riser pipe will strike said baffle, a baffle positioned above said second riser pipe at a lower level than said firstmentioned baffle in said vapor chamber so that liquid passing through said second riser pipe will strike said baffle, said riser pipes and said baffles being so positioned that liquid circulating through said first riser pipe will contact liquid circulating through said second riser pipe in said vapor chamber, and means for injecting a gaseous fluid into said riser pipes for the conveying of liquid therethrough, from said liquid to said vapor chamber.

7. Apparatus according to claim 6, in which said second riser pipe co-axially surrounds said first riser pipe defining an annular space therebetween.

8. Apparatus according to claim 6, which includes a multiple number of second riser pipes annularly surrounding said first riser pipe.

9. Apparatus according to claim 6, which includes means for rotating at least one of said baffles.

10. Apparatus according to claim 9, in which said means for rotating at least one of said baffles includes a rotary shaft extending through said first riser pipe.

11. Improvement according to claim 6, which includes means for rotating at least one of said riser pipes.

12. Apparatus according to claim 6, including liquid stirring means positioned in said vessel.

13. Apparatus according to claim 6, which includes partition means concentrically positioned in spaced relation to the walls of said vessel, defining a space therebetween extending from said liquid chamber into said vapor chamber and including means for injecting gaseous fluid into said space for the conveying of liquid therethrough, from said liquid to said vapor chamber.

14. Apparatus according to claim 13, which includes guide means positioned for guiding liquid from said riser pipes to impinge on liquid passing through said space.

15. Apparatus according to claim 14, in which said vessel is a cylindrical vessel and in which said partition means are cylindrical partition means positioned to define an annular space with the vessel wall.

16. Apparatus according to claim 13, which includes heating means positioned in said space.

17. Apparatus according to claim 13, which includes heat-exchange means positioned in said vessel.

18. Apparatus according to claim 13, which includes gas-inlet means positioned in said vessel between said riser pipes and said partition means.

19. Apparatus according to claim 13, which includes a bell-shaped member positioned in the upper portion of said vessel for receiving and removing condensate therefrom.

20. Apparatus according to claim 6, in which said second riser pipe is an annular pipe defined by the wall of said vessel and a member concentrically positioned within said wall in spaced relation thereto and in which said means for injecting a gaseous fluid into said riser pipes are positioned in said first riser pipe and in said annular pipe.

References Cited in the file of this patent

UNITED STATES PATENTS

| Number | Name | Date |
|---|---|---|
| 1,936,964 | Gensecke | Nov. 28, 1933 |
| 2,163,303 | Bonotto | June 20, 1939 |
| 2,179,833 | Sondermann | Nov. 14, 1939 |
| 2,202,008 | Ittner | May 28, 1940 |
| 2,261,939 | Morlock | Nov. 11, 1941 |
| 2,274,802 | Mills | Mar. 3, 1942 |
| 2,479,267 | Sandford | Aug. 16, 1949 |

FOREIGN PATENTS

| Number | Country | Date |
|---|---|---|
| 135,679 | Germany | Nov. 11, 1902 |
| 163,444 | Germany | Oct. 6, 1905 |